(12) United States Patent
Yamada

(10) Patent No.: US 11,074,431 B2
(45) Date of Patent: Jul. 27, 2021

(54) FACIAL RECOGNITION DEVICE

(71) Applicant: AISIN SEIKI KABUSHIKI KAISHA, Kariya (JP)

(72) Inventor: Yuya Yamada, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 91 days.

(21) Appl. No.: 16/496,123

(22) PCT Filed: Aug. 29, 2017

(86) PCT No.: PCT/JP2017/030901
§ 371 (c)(1),
(2) Date: Sep. 20, 2019

(87) PCT Pub. No.: WO2018/173314
PCT Pub. Date: Sep. 27, 2018

(65) Prior Publication Data
US 2020/0034603 A1   Jan. 30, 2020

(30) Foreign Application Priority Data
Mar. 24, 2017 (JP) .............................. JP2017-059724

(51) Int. Cl.
G06K 9/00 (2006.01)
G06T 17/00 (2006.01)
(Continued)

(52) U.S. Cl.
CPC .......... *G06K 9/00268* (2013.01); *G06T 7/246* (2017.01); *G06T 7/50* (2017.01);
(Continued)

(58) Field of Classification Search
CPC ....... G06K 9/00268; G06T 17/00; G06T 7/73; G06T 7/50; G06T 7/246; G06T 2207/30201
See application file for complete search history.

(56) References Cited

U.S. PATENT DOCUMENTS

2006/0280380 A1    12/2006  Li
2012/0327196 A1*   12/2012  Ohba ..................... H04N 7/147
                                                            348/49
(Continued)

FOREIGN PATENT DOCUMENTS

JP    2004-70514 A    3/2004
JP    2006-350498 A   12/2006
(Continued)

OTHER PUBLICATIONS

Choi et al. "A Real-Time System for Automatic Creation of 3D Face Models from a Video Sequence." IEEE International Conference on Acoustics, Speech, and Signal Processing, May 13, 2002, pp. II-2121-II-2124 (Year: 2002).*

(Continued)

*Primary Examiner* — Jon Chang
(74) *Attorney, Agent, or Firm* — Sughrue Mion, PLLC

(57) ABSTRACT

A facial recognition device includes a determination section for determining presence of an accessory worn on a face from a captured image capturing a human face, an acquisition section for acquiring height information indicative of a height of the accessory from the surface of the face in case the determination section determines presence of the accessory on the face, a production section for producing a three-dimensional face model based on the height information and a fitting section for fitting the face included in the captured image, with using the three-dimensional face model.

4 Claims, 5 Drawing Sheets

(51) Int. Cl.
  *G06T 7/73*      (2017.01)
  *G06T 7/50*      (2017.01)
  *G06T 7/246*     (2017.01)

(52) U.S. Cl.
  CPC ................ *G06T 7/73* (2017.01); *G06T 17/00*
           (2013.01); *G06T 2207/30201* (2013.01)

(56) References Cited

U.S. PATENT DOCUMENTS

2017/0344807 A1* 11/2017 Jillela ................ G06K 9/00288
2018/0005448 A1*  1/2018 Choukroun ............. G06T 5/005

FOREIGN PATENT DOCUMENTS

JP     2010-186274 A    8/2010
JP        5271742 B2    8/2013

OTHER PUBLICATIONS

International Search Report for PCT/JP2017/030901 dated Nov. 14, 2017 [PCT/ISA/210].

* cited by examiner

FACIAL RECOGNITION DEVICE

CROSS REFERENCE TO RELATED APPLICATIONS

This application is a National Stage of International Application No. PCT/JP2017/030901 filed Aug. 29, 2017, claiming priority based on Japanese Patent Application No. 2017-059724 filed Mar. 24, 2017.

TECHNICAL FIELD

This invention relates to a facial recognition device for recognizing a human face.

BACKGROUND ART

Conventionally, a facial recognition device for recognizing a human face has been utilized. As such technique for recognizing a human face, there are techniques disclosed in Patent Documents 1-3 identified below for instance.

A sunglasses-wearing detection device disclosed in Patent Document 1 includes an image input section for acquiring an input image and an image processing section for detecting a person wearing sunglasses from the input image. The image processing section includes a head detection means for detecting a head area corresponding to the head of the person from the input image, a black pixel extraction means for extracting black pixels exhibiting approximately black color included in the head area, a feature value calculation means for calculating a feature value of the head area based on distribution of black pixels, and a determination means for determining that a person whose image has black pixels distributed in approximately left/right symmetry wears sunglasses and that a person whose image has black pixels distributed in no such left/right symmetry does not wear sunglasses.

According to a face condition detection device disclosed in Patent Document 2, a face of a subject (a person) is captured by a face image capture (photographing) means and based on this captured face image, the orientation of the face of the subject is detected. This face condition detection device includes an eyeglasses detection means for detecting whether a subject wears eyeglasses or not, a background reflection detection means whether any background reflection exists in the eyeglasses in the event of detection of the subject wearing eyeglasses by the eyeglasses detection means, a feature value detection means for detecting the positon of background reflection detected by the background reflection detection means or a feature value of the detected eyeglasses, and a face orientation detection means for detecting the orientation of the subject's face based on the feature value detected by the feature value detection means.

An image processing device disclosed in Patent Document 3 includes a resolution conversion means for converting at least a predetermined structure portion of an input image into a desired resolution, a model representing the structure in terms of a statistical feature value obtained by implementing a predetermined statistical processing on a plurality of images representing a predetermined structure and having a same resolution as the desired resolution, and a reconstruction means for adapting the structure in the input image after the resolution conversion to the model, thus reconstructing an image representing the structure after the adaptation.

BACKGROUND ART DOCUMENTS

Patent Documents

Patent Document 1: Japanese Unexamined Patent Application Publication No. 2010-186274
Patent Document 2: Japanese Unexamined Patent Application Publication No. 2002-226516
Patent Document 3: Japanese Unexamined Patent Application Publication No. 2006-350498

SUMMARY OF THE INVENTION

Problems to be Solved by Invention

The sunglasses-wearing detection device disclosed in Patent Document 1 determines wearing or non-wearing of sunglasses of a person in an image, based on edges, brightness values, left/right symmetry, etc. For this reason, although the device can detect wearing or non-wearing of sunglasses, the device fails to take into consideration the fitting (matching) in case the person faces sideways, thus being unable to detect a sideways oriented face.

In the case of the face condition detection device disclosed in Patent Document 2, sunglasses are detected and also background reflection on the lenses thereof is detected. Then, based on position alignment relative to an image of a pillar, a rear view mirror inside the vehicle cabin reflected thereon or a condition of the frame of the eyeglasses, the face orientation is detected. Therefore, in the case of absence of background reflection on the lenses, the detection of the face orientation is not possible. Further, as the reflection image differs depending on the shape of the sunglasses, position alignment is not easy and use of special sunglasses is required.

In the case of the image processing device disclosed in Patent Document 3, a face is detected using a three-dimensional model of the face and feature points (2D) detected from the image and the resolution is changed. Thus, appropriate detection is impossible not only in case a part of the face is hidden by some accessory or face part is hidden by sunglasses or a mask from the beginning, but also in case a face part is hidden by a hat collar or the like, during the face recognition.

In view of the above, there is a need for a facial recognition device capable of recognizing a face appropriately even in the presence of some accessory on the face.

Solution

According to a characterizing feature of a facial recognition device relating to the present invention, the facial recognition device comprises:

a determination section for determining presence of an accessory worn on a face from a captured image capturing a human face;

an acquisition section for acquiring height information indicative of a height of the accessory from the surface of the face in case the determination section determines presence of the accessory on the face;

a production section for producing a three-dimensional face model based on the height information; and a fitting section for fitting the face included in the captured image, using the three-dimensional face model.

With the above-described configuration, it is possible to identify an accessory from a captured image capturing a human face and to produce a three-dimensional face model suited to or adapted for the accessory, thus implementing fitting. Therefore, even when an accessory exists on the face, appropriate face recognition is made possible.

Preferably, the facial recognition device further comprises:

a storage section in which relationship between the accessory and the height information is stored in advance;

an identification section for identifying the accessory if the determination section determines presence of the accessory on the face; and the acquisition section acquiring height information of the accessory identified by the identification section from the storage section.

With the above-described arrangement, a three-dimensional face model in the case of a mask or sunglasses being worn can be readily produced by superposing a shape of a standard mask or sunglasses prepared in advance on a three-dimensional face model in the case of absence of any accessory, Preferably, the facial recognition device further comprises a rotation amount calculation section for calculating a rotation amount of the face by tracking a feature point of the face after the fitting by the fitting section, the rotation amount calculation section being configured to cancel the hidden feature point from a tracking target if the accessory is a hat and the hidden feature point is hidden by the hat as the person faces downwards.

With the above-described arrangement, in case the feature point is hidden as the person faces downwards, this hidden feature point will be canceled or eliminated from the tracking target and by tracking a feature point based on a hat collar in continuation, it is possible to prevent missing of the face due to sudden disappearance of a feature point which has been tracked. Therefore, facial recognition can be carried out accurately.

Still preferably, the height of the accessory from the surface of the face is obtained by calculation by an image recognition process.

With the above-described arrangement, by e.g. a monocular stereo matching technique, a three-dimensional shape of a collar of a hat can be grasped. Therefore, even when the accessory is a hat, a three-dimensional face model can be readily produced based on this three-dimensional shape.

EMBODIMENTS

A facial recognition device relating to the present invention is configured to be able to recognize a face appropriately even when orientation of face wearing an accessory is changed. Next, a facial recognition device 1 according to the instant embodiment will be explained.

Figure 1:
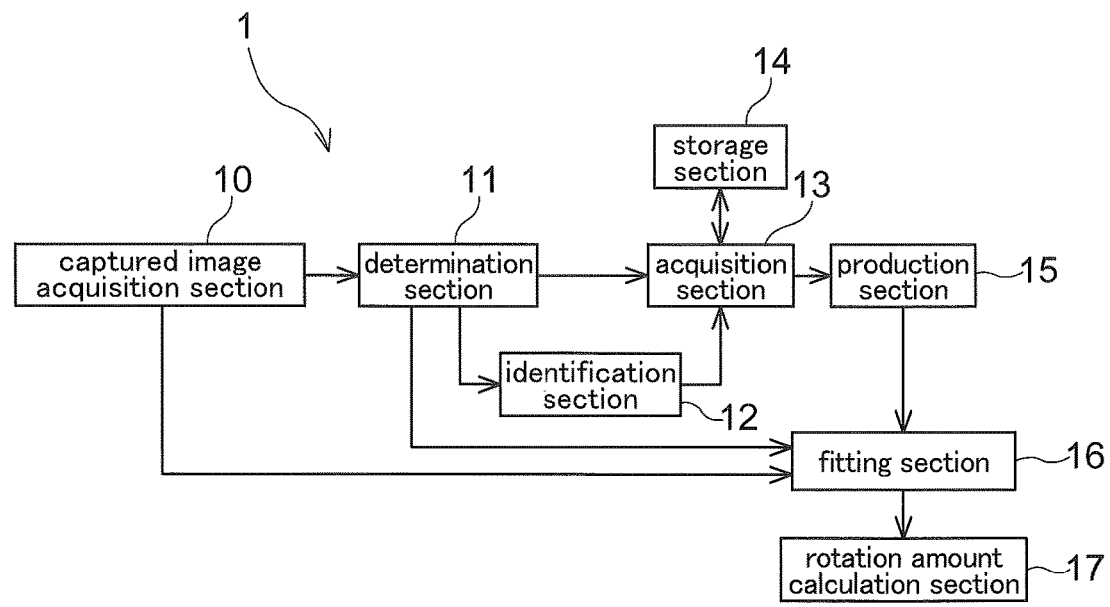
FIG. 1 is a block diagram schematically showing a configuration of a facial recognition device.

FIG. 1 is a block diagram schematically showing the configuration of the facial recognition device 1. This facial recognition device 1, as shown in FIG. 1, includes a captured image acquisition section 10, a determination section 11, an identification section 12, an acquisition section 13, a storage section 14, a production section 15, a fitting section 16 and a rotation amount calculation section 17. The above-cited respective sections are constituted of hardware including a CPU as the core component thereof and/or software for carrying out a process relating to facial recognition. In this embodiment, there will be explained an example in which the facial recognition device 1 is used for recognizing a face of a person seated in a seat mounted in a vehicle.

The captured image acquisition section 10 effects photographing (i.e. image-capturing) from the front side of the seat mounted in the vehicle toward the seat. Preferably, the captured image acquisition section 10 employs an infrared camera capable of discriminating an object captured in the acquired captured image even when the amount of ambient light available is limited, for instance (e.g. during nighttime, or in the shade). This captured image acquisition section 10 may also employ an infrared camera included in another device. In the instant embodiment, the captured image acquisition section 10 is configured such that its image-capturing (photographing) range and its image-capturing (photographing) direction are set to allow at least the face of a person to be included in a captured image when the person is seated in the vehicle seat. A captured image acquired by the captured image acquisition section 10 is transmitted to the determination section 11 which will be described below.

Figure 2:
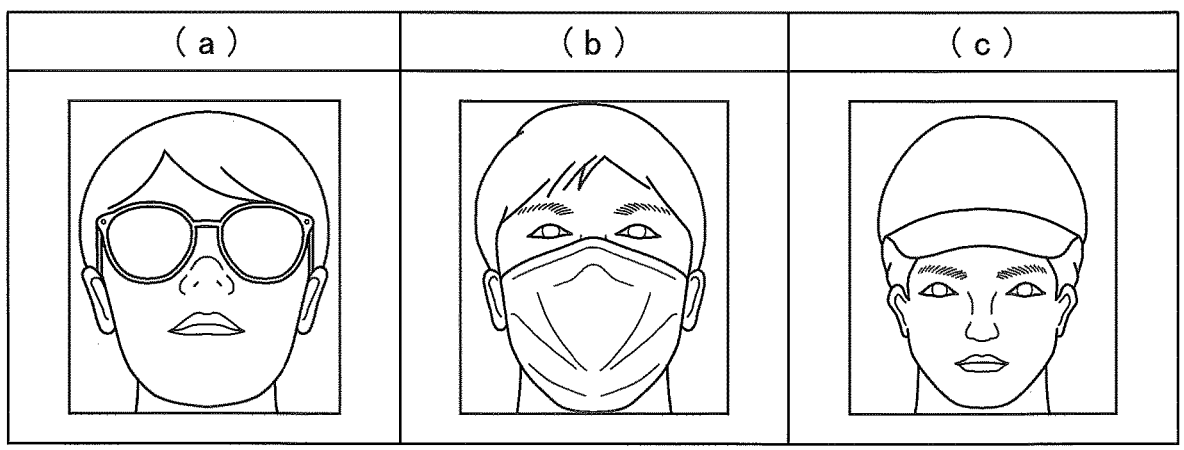
FIG. 2 is a view showing one example of accessory.

The determination section 11 determines presence of an accessory worn on the face from the captured image capturing the person's face. To this end, the determination section 11 firstly detects a face area showing the face in the captured image transmitted from the captured image acquisition section 10. This detection of face area, though not detailed herein, can be done by a face recognition process using a known machine learning technique. Next, the determination section 11 determines whether an accessory is worn on the face shown in the detected face area or not. The term "accessory" as used in this embodiment means sunglasses, a mask, or a hat. FIG. 2 (a) shows an example in which sunglasses are worn. FIG. 2 (b) shows an example in which a mask is worn. FIG. 2 (c) shows an example in which a hat is worn. Presence/absence of such accessory is determined by a known facial recognition process. If the determination section 11 determines presence of such accessory on the face, the determination section 11 transmits the result of this determination to the identification section 12 to be described below. On the other hand, if the determination section 11 determines absence of such accessory, the determination section 11 then transmits the result of this determination to the fitting section 16 to be described later.

The identification section 12 identifies (i.e. specifies the type of) the accessory in case the determination section 11 has determined presence of an accessory on the face. As described above, the identification section 12 receives transmission of the determination result in case the determination section 11 has determined presence of an accessory on the face. Upon receipt of this determination result, the identification section 12 proceeds to identify the accessory worn on the face included in the face area. In this accessory identification, if the positions of both eyes in the face area and their vicinities are covered by a color (colors) different from the other area, the accessory can be identified as sunglasses. Or, if the position of the nose or the mouth in the face area and its vicinity are covered with a color (colors) different from the other area, the accessory can be identified as a mask. Further, the upper portion of the face in the face area is covered or hidden, the accessory can be identified as a hat. Such identification can be implemented by a known image recognition process or technique. The result of such identification by the identification section 12 is transmitted to the acquisition section 13 to be described below.

If the determination section 11 has determined presence of an accessory on the face, the acquisition section 13 acquires "height information" indicative of a height of the accessory from the surface of the face. In such case i.e. "the determination section 11 has determined presence of an accessory on the face", the determination section 11 may directly indicate the result of the determination to the acquisition section 13. Alternatively, as described above, when the termination section 11 transmits the determination result to the identification section 12 and the identification section 12 specifies the accessory, the identification section 12 may indicate the result of the identification to the acquisition section 13, thus indicating the determination of presence of an accessory on the face made by the determination section 11. Further, the "height of the accessory from the surface of the face" means the height from the surface of the face to the respective part of sunglasses in the case of the accessory being sunglasses. Or, it means the height from the surface of the face to the respective part of a mask in the case of the accessory being a mask. Or, it means the height from the surface of the face to the respective part of a hat in the case of the accessory being a hat. And, such height from the surface of the face to the accessory can be heights from the face surface to all edges of the accessory or can also be a height (heights) from the face surface to some edge portion of the accessory in order to reduce the calculation process. And, such height of the accessory will be handled as "height information" in the facial recognition device 1.

Here, in the instant embodiment, the storage section 14 has stored therein in advance the relationships between the respective accessories and the height information associated respectively therewith. As described above, the relationship between the accessory and the height information is a relationship indicative of the height of sunglasses from the face surface in the case the accessory is sunglasses. Or, it is a relationship indicative of the height of mask from the face surface in case the accessory is a mask. As for such sunglasses and mask, such heights are only general heights. So, it is preferred that the relationships between the respective accessories and the height information be stored in advance. However, because a hat can vary greatly in terms of its shape and the size of collar, the storage section 14 need not store the relationship between the hat and the height information in advance.

The acquisition section 13 acquires the height information of the accessory identified by the identification section 12 from the storage section 14. Namely, the acquisition section 13 acquires sunglasses height information stored in advance in the storage section 14 in case the identification section 12 has identified the accessory as sunglasses. The acquisition section 13 acquires mask height information stored in advance in the storage section 14 in case the identification section 12 has identified the accessory as a mask. With this, the acquisition section 13 can acquire height information indicative of a standard sunglasses or mask from the face surface.

On the other hand, a hat as an accessory can be of a great variety in its shape, as described above. Then, in this case, the acquisition section 13 acquires by calculation a height of the accessory from the face surface using an image recognition process using the captured image acquired by the captured image acquisition section 10. Preferably, the image recognition process can be carried out such that firstly, a three-dimensional shape is recognized from the captured image and then a three-dimensional shape of the collar of the hat is acquired by image recognition, using a standard monocular stereo-matching technique utilizing time series. Such height information acquired by the acquisition section 13 will be transmitted to the production section 15 to be described below.

The production section 15 produces a three-dimensional face model based on the height information. The height information is transmitted from the acquisition section 13 to the production section 15. Here, the "three-dimensional face model" means a model representing a human face three-dimensionally. Specifically, it is a model configured to be capable of translation along the respective directions of an X axis, a Y axis and a Z axis which are defined based on or relative to the center of the face and capable also of rotation about these respective axes of the X axis, the Y axis and the Z axis. Such three-dimensional face models will be prepared in correspondence with the respective accessories.

Figure 3:
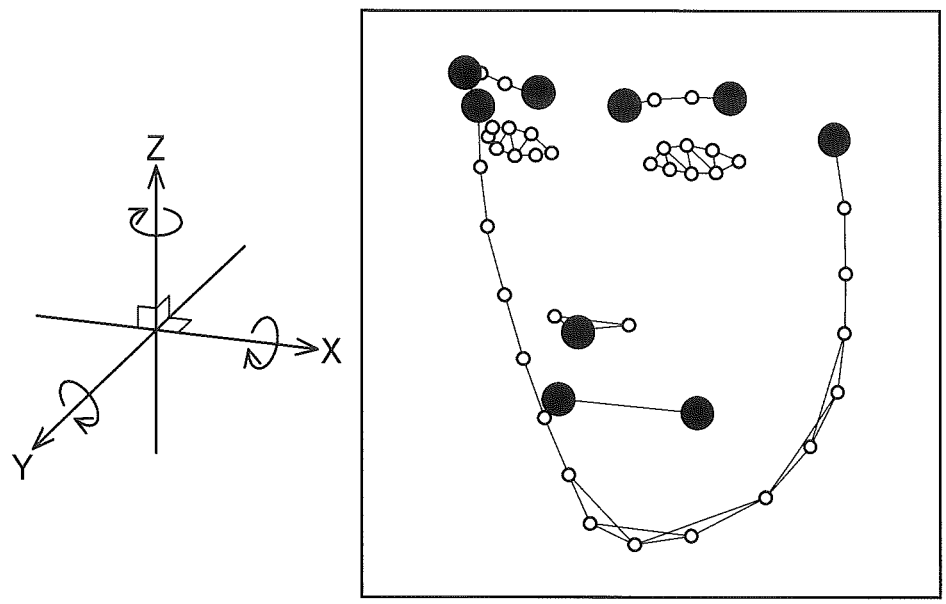
FIG. 3 shows a three-dimensional face model in the case of absence of accessory.
Figure 4:
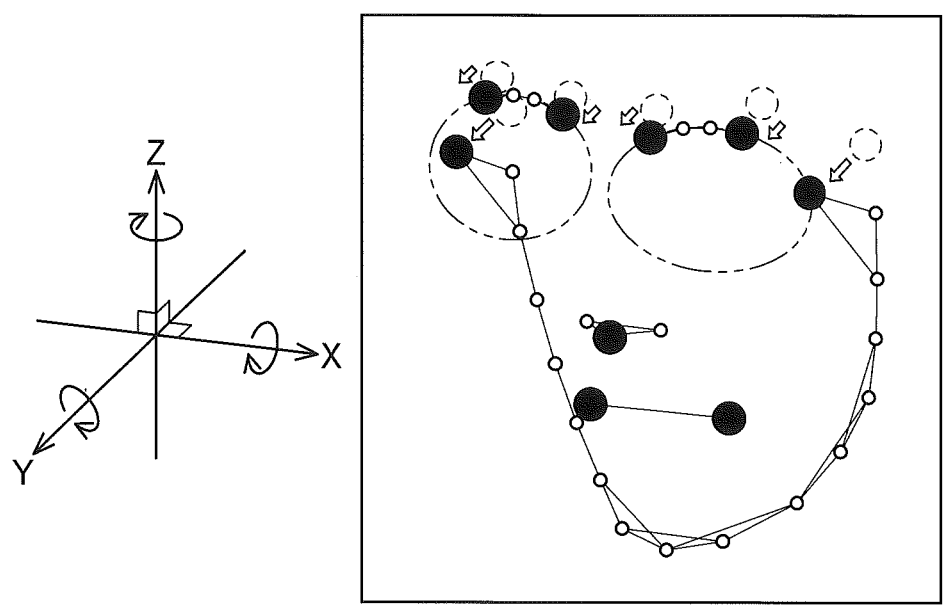
FIG. 4 shows a three-dimensional face model in the case of an accessory of sunglasses.

FIG. 3 shows a three-dimensional face model in the case of absence of accessory on the face. In the drawing, the closed circles represent feature points for use in the facial recognition, whereas the open circles represent parts of the face provided for facilitating understanding. The production section 15 produces three-dimensional face models corresponding to the respective accessories, based on the three-dimensional face model and height information of such case of absence of any accessory. More particularly, in the case of sunglasses being worn, the production section 15 will produce a three-dimensional face model adapted for sunglasses (may be referred to as "sunglasses three-dimensional face model"), with increasing the height of the surrounding the eyes based on the sunglass height information. Such sunglasses three-dimensional face model is shown in FIG. 4. Incidentally, in this FIG. 4 illustration, the feature points prior to the height increase described above are denoted by broken lines, and the feature points after the height increase are denoted with filled circles. For further facilitating the understanding, the sunglasses too are denoted with two-dot chain lines. Those feature points present around the nose and the mouth do not change by wearing of sunglasses, so the feature points in the case of accessory absence will be used as they are.

Figure 5:
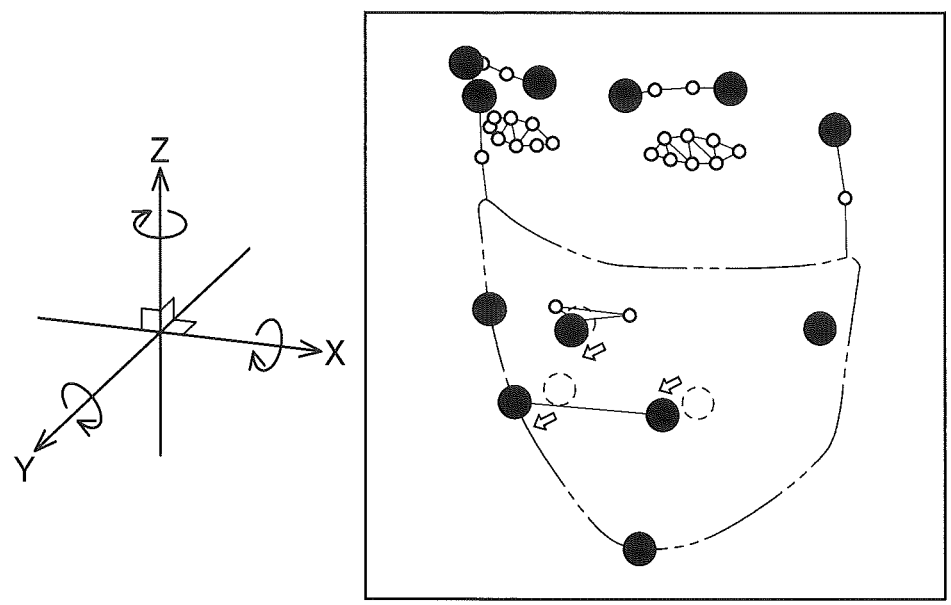
FIG. 5 shows a three-dimensional face model in the case of an accessory of a mask.

In the case of a mask being worn, the production section 15 will produce a three-dimensional face model for mask (may be referred to as "mask three-dimensional face model") with increasing the height of the surrounding of the nose and the mouth based on the mask height information. Such mask three-dimensional face model is shown in FIG. 5. Incidentally, in this FIG. 5 illustration too, the feature points prior to the height increase are denoted with broken lines and the feature points after the height increase are denoted with filled circles. Again, for facilitating the understanding, the mask too is denoted with two-dot chain lines. As those feature points present around eyes do not change due to wearing of a mask, the feature points in the case of accessory absence are used as they are.

Meanwhile, the sunglasses three-dimensional face model and the mask three-dimensional face model can be produced on each occasion of use. Alternatively, such models once produced may be stored and can be retrieved for each occasion of use thereof.

Figure 6:
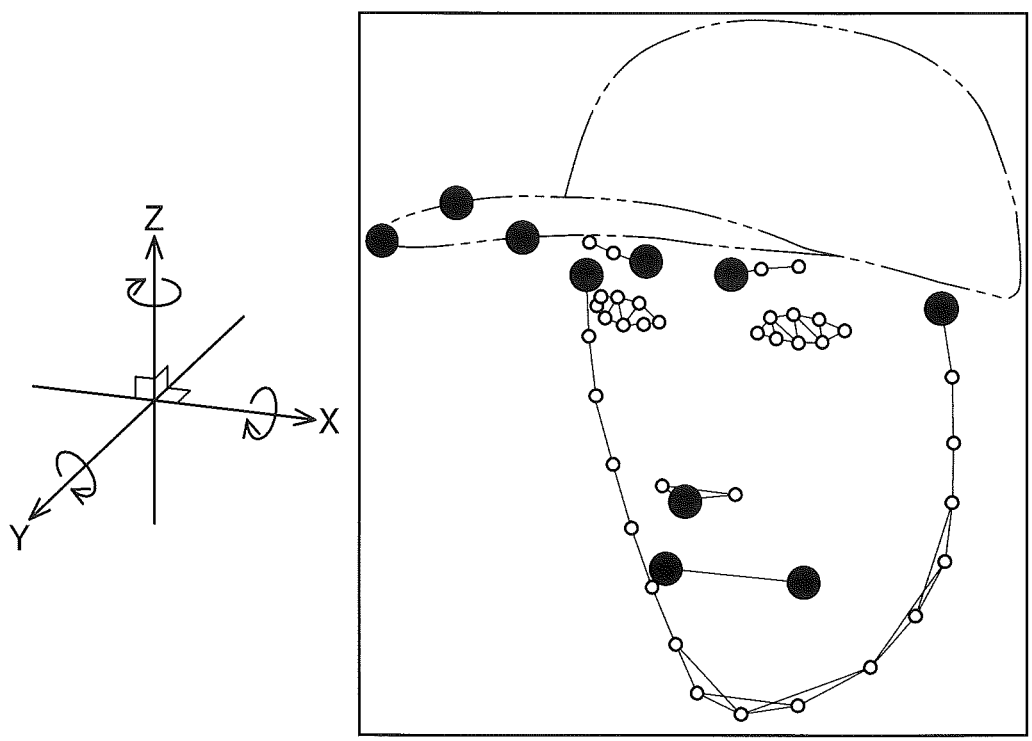
FIG. 6 shows a three-dimensional face model in the case of an accessory of a hat.

On the other hand, as described above, in case of the accessory being a hat, the acquisition section 13 will acquire the three-dimensional shape of the collar of the hat through image recognition, using an image recognition technique. More specifically, the production section 15 produces the three-dimensional face model adapted for hat (may be referred to as "hat three-dimensional face model") by superposing the acquired three-dimensional shape on the three-dimensional face model in the case of accessory absence. This hat three-dimensional face model may be produced in correspondence with the shape of a hat on each occasion of an accessory being identified as a hat. One example of such hat three-dimensional face model is shown in FIG. 6. In FIG. 6, for facilitating the understanding, a hat is denoted with two-dot chain lines. In this way, the production section 15 produces a three-dimensional face model in correspondence with (or adapted for) respective accessory. A three-dimensional face model produced by the production section 15 is transmitted to the fitting section 16 to be described below.

The fitting section 16 effects fitting of a face included in a captured image using a three-dimensional face model. This three-dimensional face model is transmitted from the production section 15. Further, to this fitting section 16, a captured image is also transmitted from the captured image acquisition section 10. The fitting section 16 detects feature points of the face included in the captured image. Here, the "feature points of the face" mean an eyebrow head, an eyebrow end, a leading corner of eye, a trailing corner of an eye, a nasal column, a mouth corner, etc. In addition to these feature points, in case sunglasses are worn on the face, e.g. edges of the sunglasses become feature points. In case a mask is worn, e.g. edges of the mask become the feature points. In case a hat is worn, e.g. the collar of the hat become the feature points. On the other hand, in also the three-dimensional face models produced in correspondence with respective accessories, such feature points as follows are set. Here, the "fitting" means matching (fitting) an object A with a different object B. In the instant embodiment, it means matching (fitting) "the feature points of the face included in the captured image" to "the feature points of the three-dimensional face model". Therefore. the fitting section 16 effects e.g. translation of a three-dimensional face model along the directions of the X axis, the Y axis and the Z axis which are defined based on the center of the three-dimensional face model or rotation thereof about the respective axes of the X axis, the Y axis and the Z axis, in such a manner that the feature points of the three-dimensional face model adapted for an accessory worn on the face included in the captured image may agree to the feature points of the captured image.

Figure 7:
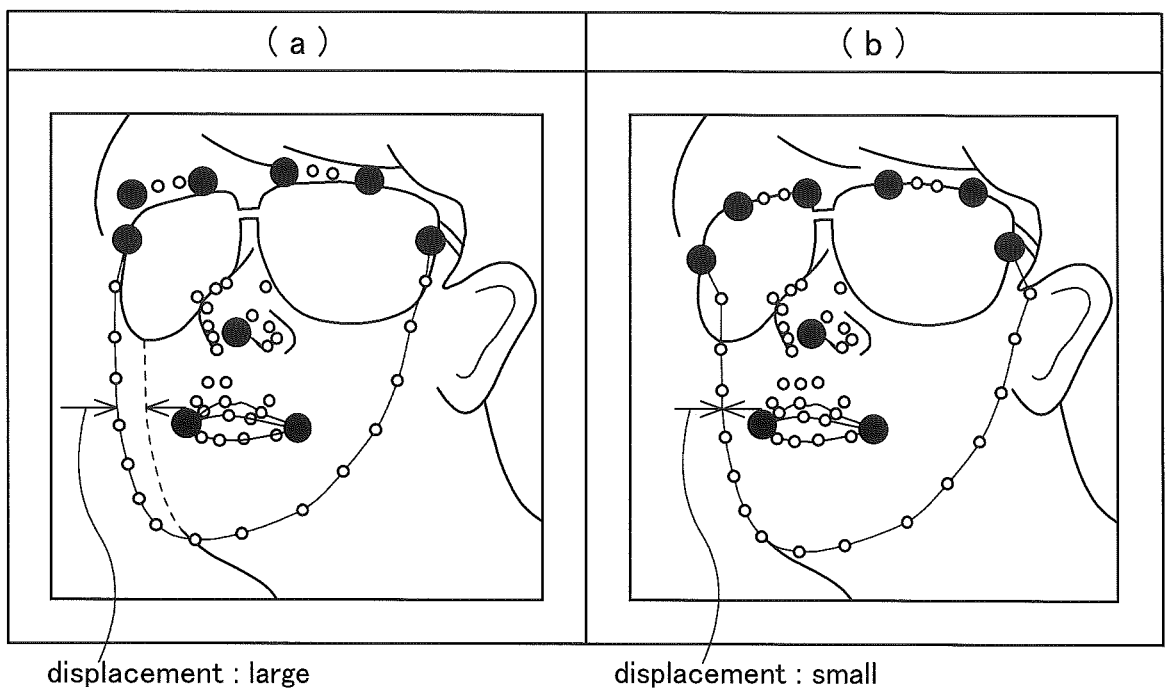
FIG. 7 is a view showing difference of recognition results between a case not using three-dimensional face mode adapted for sunglasses and a case using the three-dimensional face model adapted for sunglasses.

FIG. 7 (*a*) shows a result of fitting effected on a face of a person wearing sunglasses, using a three-dimensional face model in the case of accessory absence.

FIG. 7 (*b*) shows a result of fitting on the face of the person wearing sunglasses, using the sunglasses three-dimensional face model. For facilitating the understanding, in FIG. 7, the feature points are denoted with filled circles, whereas the contour of the face are denoted with open circles. As shown in FIG. 7 (*a*), in the result of fitting effected using the three-dimensional face model in the case of accessory absence, matching made between the three-dimensional face model with the feature points (outer edge portions of sunglasses) resulted in significant displacement between the contour (denoted with open circles) in the three-dimensional face model and the contour (denoted with broken lines) in the captured image (this displacement is greater than displacement occurring in the example of FIG. 7 (*b*) to be described below). Though not shown, this is also true with the case of fitting using the three-dimensional face model in the case of accessory absence on a face of a person wearing a mask.

On the other hand, in the case of fitting effected on a face of a person wearing sunglasses using the sunglasses three-dimensional face model, as shown in FIG. 7 (*b*), even when the feature points (outer edges of the sunglasses) are matched with the three-dimensional face model, resultant displacement between the contour of the three-dimensional face model and the contour of the captured image is less than that resulted in the case shown in FIG. 7 (*a*). In this way, by effecting fitting using a three-dimensional face model in compliance with or adapted for the particular accessory, it becomes possible to adapt the three-dimensional face model to the orientation of the face in the captured image. The amount of translation and/or rotation of the three-dimensional face model used at the time of fitting by the fitting section 16 is/are transmitted to the rotation amount calculation section 17 to be described below. Further, in this, preferably, information indicative of those feature points in the captured image successfully matched with feature points in the three-dimensional face model is also transmitted to the rotation amount calculation section 17 to be described next.

The rotation amount calculation section 17 calculates a rotation amount of the face by tracking the feature points of the face, after the fitting operation by the fitting section 16. To this rotation amount calculation section 17, as described above, the translation amount and the rotation amount used in the matching of the feature points of the three-dimensional face model with the feature points of the captured image, and also the information indicative of the feature points of the captured image successfully matched with the feature points of the three-dimensional face model are transmitted from the fitting section 16. With this, the rotation amount calculation section 17 can calculate the amount of rotation of the face included in the captured image used when the fitting section 16 effected fitting, relative to a predetermined reference direction (e.g. the orientation direction of the captured image acquisition section 10).

Further, to the rotation amount calculation section 17, acquired captured images will be transmitted one after another from the captured image acquisition section 10. Based on the information transmitted from the fitting section 16 indicative of the feature points in the captured image successfully matched with the feature points of the three-dimensional face model, the rotation amount calculation section 17 identifies these feature points and tracks (follows) these feature points in the captured images transmitted one after another from the captured image acquisition section 10. Then, in accordance with the amount of the direction of this tracking, the rotation calculation section 17 calculates the amount of rotation of the face included in the captured image.

Here, if the person included in the captured image is wearing a hat with collar, if this person faces downwards in the course of implementation of feature point tracking by the rotation amount calculation section 17, the feature points (e.g. eye, eyebrow, etc.) may be hidden by the collar. Thus, preferably, the rotation amount calculation section 17 is configured to cancel (i.e. eliminate) such hidden feature point(s) from the tracking targets, if the accessory is a hat AND the feature points are hidden by the hat as the person orients his/her face downwards and then to continue tracking of the feature points based on the collar of the hat. With this arrangement of cancelling hidden feature point(s) from the tracking targets and continuing tracking of the feature points based on the collar of the hat, occurrence of inconvenience of a tracked feature point disappearing suddenly to lose the sight of the face can be prevented. Therefore, a hidden feature point is not erroneously used in the calculation of the rotational amount, thus erroneous calculation can be avoided. Consequently, the facial recognition device 1 can implement the facial recognition with high accuracy.

Figure 8:
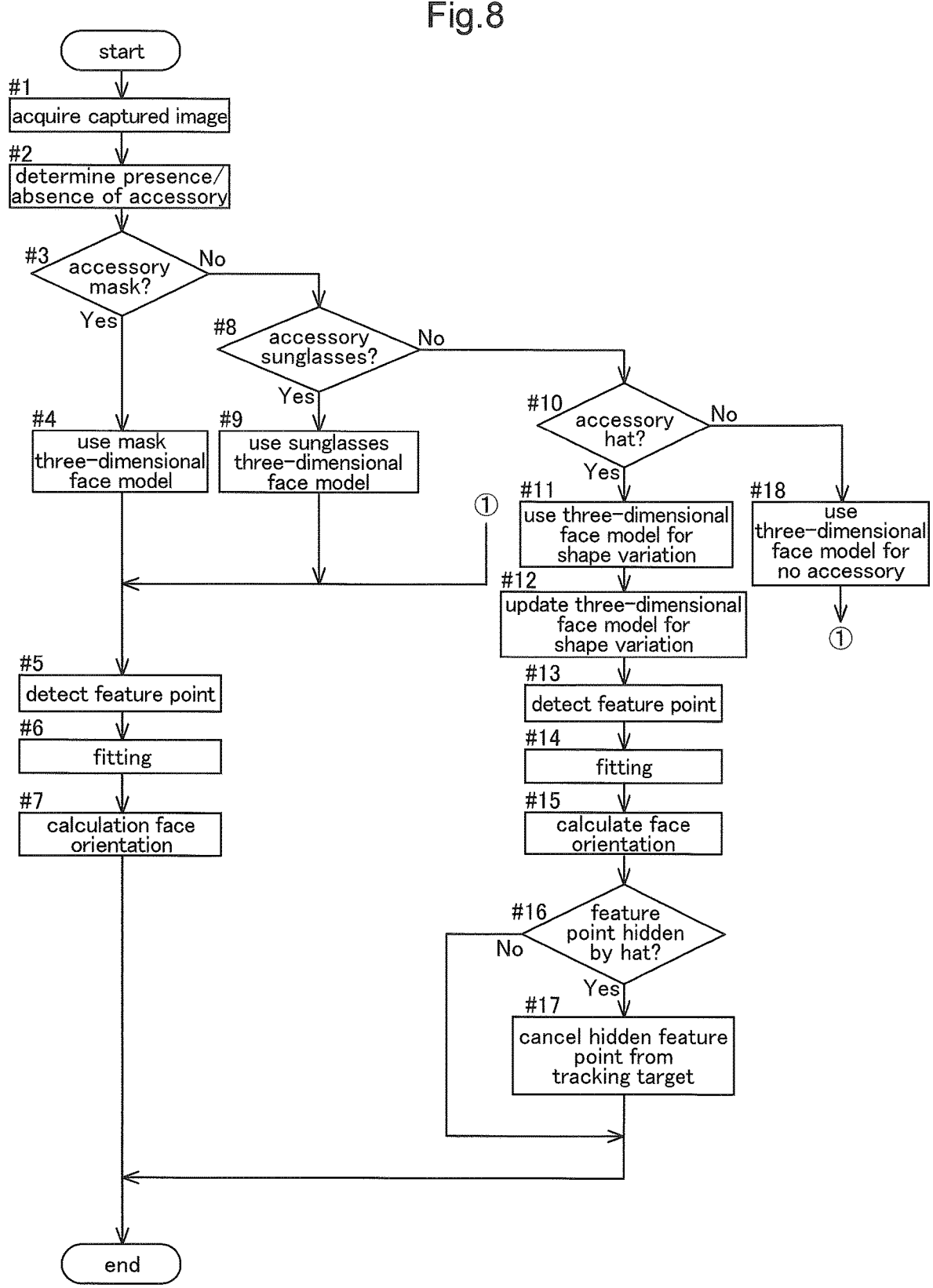
FIG. 8 is a flowchart showing processing implemented by the facial recognition device.

Next, the face recognition processing by the facial recognition device 1 will be explained with reference to the flowchart of FIG. 8. Firstly, the captured image acquisition section 10 acquires a captured image (step #1). Using this captured image, the determination section 11 determines whether any accessory is present on the face or not (step #2).

If the determination section 12 determines the accessory being a mask (step #3: YES), the fitting section 16 uses the mask three-dimensional face model (step #4). The fitting section 16 detects feature points in the captured image (step #5) and effects fitting between the feature points in the three-dimensional face model and the feature points detected from the captured image (step #6).

The rotation amount calculation section 17 calculates the orientation of the face, based on the rotation amount and the translation amount at the time of fitting between the feature points of the three-dimensional face model with the feature points detected from the captured image and the rotation amount and the rotation direction based on the tracking of the detected feature points (step #7).

At step #3, if the identification section 12 identifies the accessory not being a mask (step #3: NO) and identifies it as sunglasses (step #8: YES), the fitting section 16 employs the sunglasses three-dimensional face model (#9) and continues the process from step #5.

At step #8, if the identification section 12 identifies the accessory not being sunglasses (step #8: NO) and identifies it as a hat (step #10: YES), the fitting section 16 will employ the three-dimensional face model adapted for shape variation (step #11), the production section 15 updates this three-dimensional face model for shape variation, based on the height information indicating the height of the accessory (step #12). The fitting section 16 detects the feature points in the captured image (step #13) and effects fitting between the feature points in the three-dimensional face model and the feature points detected from the captured image (step #14).

The rotation amount calculation section 17 calculates the orientation of the face, based on the rotation amount and the translation amount at the time of execution of fitting between the feature points of the three-dimensional face model with the feature points detected from the captured image and the rotation amount and the rotation direction based on the tracking of the detected feature points (step #15). In this, if any feature point is hidden by the hat (step #16: YES), the rotation amount calculation section 17 cancels this hidden feature point from the tracking target (step #17).

At step #16, if no feature point is hidden by the hat(step #16: NO), then, the processing is continued. Further, at step #10, if the accessory is not identified as being a hat (step #10: NO), the three-dimensional face model for no accessory is employed (step #18), and the processing is continued from step #5. The facial recognition device 1 implements the processing according to such flow as described above.

OTHER EMBODIMENTS

In the foregoing embodiment, it was explained that the facial recognition device 1 includes the identification section 12 and the storage section 14. However, the facial recognition device 1 may omit the identification section 12 and the storage section 14. In this case, the facial recognition device 1 may be configured such that the production section 15 produces a three-dimensional face model based on the height information acquired form the acquisition section 13.

In the foregoing embodiment, it was explained that the facial recognition device 1 includes the rotation amount calculation section 17. However, the facial recognition device 1 may omit the rotation amount calculation section 17. In this case, the facial recognition device 1 may be configured to effect the fitting between the feature points of the three-dimensional face model and the feature points of the face included in the captured image, and the remaining subsequent processing may be effected by other device.

In the foregoing embodiment, it was explained that the height of an accessory from the face surface is obtained by calculation through an image recognition process. However, this may be obtained by any other method or the height of the accessory may be set to a predetermined value in advance.

In the foregoing embodiment, there was explained the example of the case of the facial recognition device 1 effecting recognition of a face of a person seated at a seat mounted in a vehicle. However, the facial recognition device 1 may be used in any other application or purpose.

INDUSTRIAL APPLICABILITY

The present invention is applicable to a facial recognition device for recognizing a human face.

DESCRIPTION OF SIGNS

1: facial recognition device
11: determination section
12: identification section
13: acquisition section
14: storage section
15: production section
16: fitting section
17: rotation amount calculation section

The invention claimed is:

1. A facial recognition device comprising:
   a determination section for determining presence of an accessory worn on a face from a captured image capturing a human face;
   an acquisition section for acquiring height information indicative of a height of the accessory from the surface of the face in case the determination section determines presence of the accessory on the face;
   a production section for producing a three-dimensional face model based on the height information; and
   a fitting section for fitting the face included in the captured image, using the three-dimensional face model.

2. The facial recognition device of claim 1, further comprising:
   a storage section in which relationship between the accessory and the height information is stored in advance;
   an identification section for identifying the accessory if the determination section determines presence of the accessory on the face; and
   the acquisition section acquiring height information of the accessory identified by the identification section from the storage section.

3. The facial recognition device of claim 1, further comprising:

a rotation amount calculation section for calculating a rotation amount of the face by tracking a feature point of the face after the fitting by the fitting section, the rotation amount calculation section being configured to cancel a hidden feature point from a tracking target if the accessory is a hat and the hidden feature point is hidden by the hat as the person faces downwards.

4. The facial recognition device of claim 1, wherein the height of the accessory from the surface of the face is obtained by calculation by an image recognition process.

* * * * *